(12) United States Patent
Nishigaki (10) Patent No.: US 7,009,722 B1
(45) Date of Patent: Mar. 7, 2006

(54) IMAGE PROCESSING APPARATUS FOR COMPRESSING IMAGE DATA WITH OPTIMUM COMPRESSION METHOD CORRESPONDING TO IMAGE SIZE THEREOF

(75) Inventor: Junji Nishigaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/527,230

(22) Filed: Mar. 16, 2000

(30) Foreign Application Priority Data

Mar. 16, 1999 (JP) .................................. 11-069592

(51) Int. Cl.
*G06K 15/02* (2006.01)
*G06F 3/12* (2006.01)
*G06F 13/00* (2006.01)

(52) U.S. Cl. ........................ 358/1.15; 358/1.14; 358/1.9

(58) Field of Classification Search ........ 358/1.1–1.18, 358/525, 426.03, 425.05, 426.06, 426.14, 358/449, 451; 382/166, 246, 236
See application file for complete search history.

(56) References Cited

U.S. PATENT DOCUMENTS

| | | | |
|---|---|---|---|
| 5,576,845 A | 11/1996 | Komatsu | 358/433 |
| 5,715,070 A | 2/1998 | Tone et al. | 358/468 |
| 5,745,251 A * | 4/1998 | Yamagami | 358/426 |
| 5,987,175 A | 11/1999 | Imaizumi et al. | 382/232 |
| 6,421,134 B1 * | 7/2002 | Kuroshima et al. | 358/1.15 |
| 6,553,143 B1 * | 4/2003 | Miyake et al. | 382/239 |

OTHER PUBLICATIONS

Block Coding of Still Pictures by Tomio Kishimoto et al. UDC 621.397, 12 pp. 17-24.

* cited by examiner

*Primary Examiner*—Douglas Tran
(74) *Attorney, Agent, or Firm*—Morrison & Foerster LLP (57) ABSTRACT

An image processing apparatus for storing image data in a memory, reading image data stored in a memory, and generating print data, and is provided with a size designating means for designating an image size, and a memory control means for storing in memory the image data compressed by a compression method corresponding to a specified image size.

5 Claims, 10 Drawing Sheets

IMAGE PROCESSING APPARATUS FOR COMPRESSING IMAGE DATA WITH OPTIMUM COMPRESSION METHOD CORRESPONDING TO IMAGE SIZE THEREOF

CROSS-REFERENCE TO RELATED APPLICATIONS

This application is based on Patent Application No. HEI 11-69592 filed in Japan, the content of which is hereby incorporated by reference.

BACKGROUND OF THE INVENTION

1. Field of the Invention

The present invention relates to an image processing apparatus for storing image data in a memory, reading stored image data from a memory, and generating print data (i.e., data for printing out an image on paper such as in a printer, copier, facsimile machine and the like). The present invention specifically relates to an apparatus for processing image data used for simultaneous parallel printing in a plurality of colors such as yellow (Y), magenta (M), cyan (C), and black (Bk).

2. Description of the Related Art

In color image forming apparatuses such as color printers, color copiers, color facsimile machines and the like, since full color images are formed by overlaying images of each print color Y, M, C, and Bk, the image data of each print color must be output to the printhead with optimum timing so as to not produce dislocation of the images of the various print colors. For this reason the image data of each print color are temporarily stored in a frame memory beforehand, so as to be controllably read out with optimum timing.

In these color image forming apparatuses, the processing of the image data of each print color Y, M, C, Bk must be accomplished via simultaneous parallel execution in order to be able to form the image in a short time. For this reason the image data of each print color are simultaneously stored in a frame memory beforehand, so as to allow the data to be read out in parallel via an optimum timing.

In the image forming apparatus, the memory for storing the image data must be used efficiently in order to increase the speed of image formation and/or colorize the image, and/or reduce cost. That is, although cost can be reduced by reducing memory capacity, the formation of a plurality of images at high speed becomes difficult due to the reduced number of images that can be stored simultaneously. Furthermore, when memory capacity is too small and the image data of the four colors Y, M, C, and Bk cannot be stored simultaneously, the color image formation speed is slowed because the images of the four colors Y, M, C, Bk cannot be formed simultaneously.

Image data compression methods are methods for storing a relatively large amount of image data in a relatively small capacity memory. Various image data compression methods are known, but from the perspective of image editing (rotation, trimming, masking and the like), there are compression methods which allow editing in a compressed state, and methods which do not allow editing in a compressed state. It is desirable to allow editing in a compressed state since typical image processing apparatuses expand the image data read out from the frame memory and output these data to a printhead, and do not have a dedicated editing process circuit in the latter part of the expansion circuit. The ability to edit or the lack thereof differs according to the target editing method.

SUMMARY OF THE INVENTION

An object of the present invention is to achieve high speed image formation, high speed color image formation, reduce cost, and enable image editing in a compressed state by storing a relatively large amount of image data in a relatively small memory.

The present invention is an image processing apparatus for storing image data in a memory, reading image data stored in a memory, and generating print data, and is provided with a size designating means for designating an image size, and a memory control means for storing in memory the image data compressed by a compression method corresponding to a specified image size.

Furthermore, the present invention is an image processing apparatus for storing image data in a memory, reading image data stored in a memory, and generating print data, and is provided with a size designating means for designating an image size, a first compression means for accomplishing compression by a first compression method which allows image editing in a compressed state, a second compression means for accomplishing compression by a second compression method which does not allow image editing in a compressed state, and a memory control means for selecting a compression method according to a designated image size and storing in memory the image data compressed by the selected compression method.

In present invention, a first compression method is a fixed-length compression method, and a second compression method is a variable-length compression method, and the memory control means selects a compression method for accomplishing a second compression method after a first compression method when a designated image size is larger than a specific size of a printout sheet, and selects only a first compression method when a designated image size is smaller than the specific size of the printout sheet.

An A3 size sheet can be provided as an example of the aforesaid image size because the an A3 size sheet is the maximum printout sheet size in typical copiers and printers.

In the present invention, the image data are image data of four colors yellow, magenta, can, and black, and both compression and storage to memory are executed in parallel for each color.

These and other objects, advantages, and features of the invention will become apparent from the following description thereof, taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS (1) Print Image Controller (PIC Unit)

Figure 2:
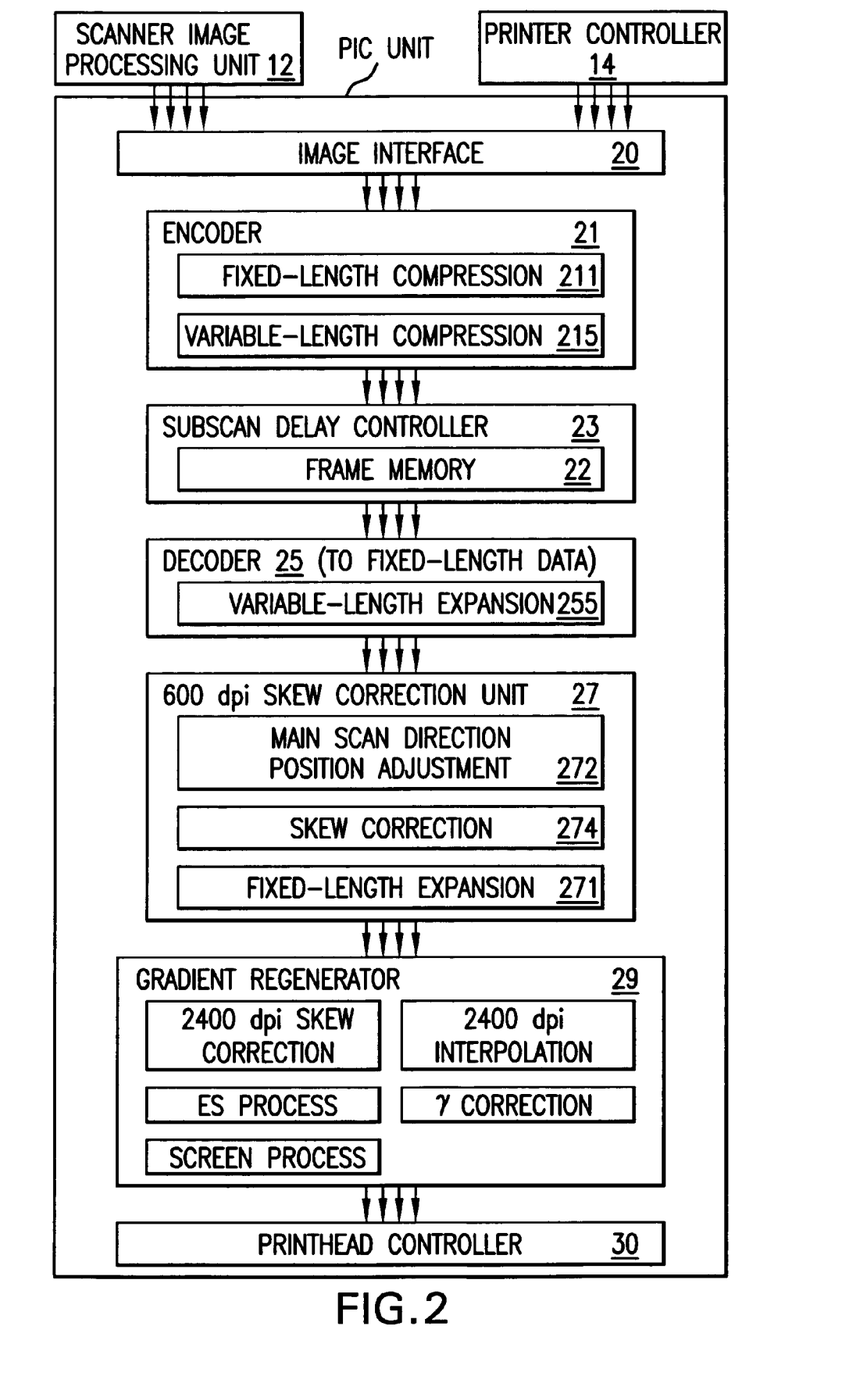
FIG. 2 is a block diagram of an embodiment of the image processing apparatus.
Figure 11:
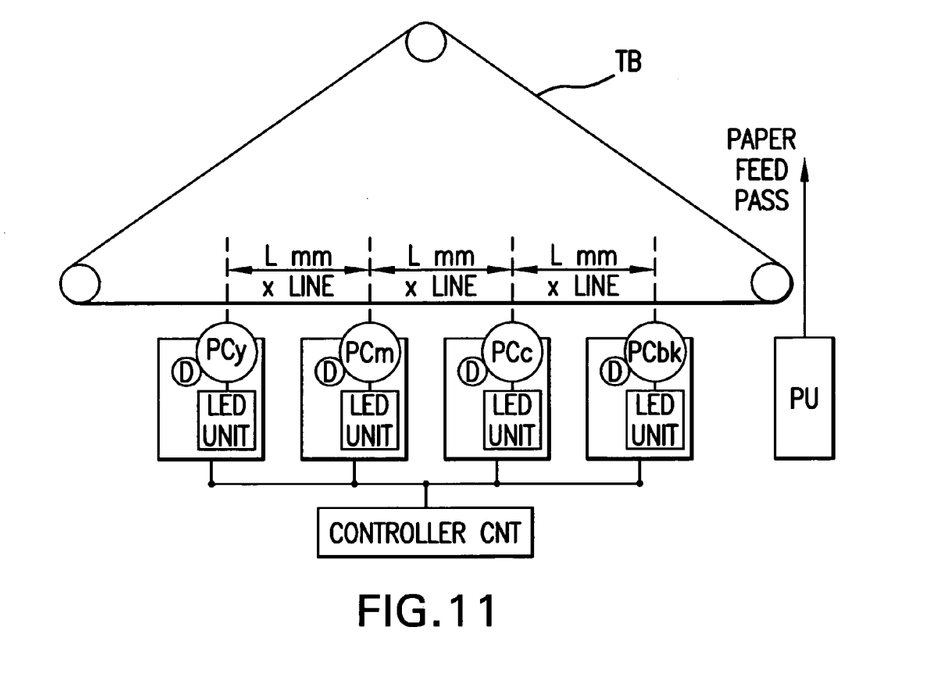
FIG. 11 shows the system construction of an image forming apparatus having an installed image processing apparatus of the present embodiment.

FIG. 11 is a schematic view showing the system construction of an embodiment of an image forming apparatus, and FIG. 2 is a block diagram of the print image controller (PIC unit, i.e., a processor for generating print data from image data) of the image forming apparatus of FIG. 11.

(1-1) System Summary

The system of FIG. 11 is an image forming apparatus of the electrophotographic type which outputs image in four colors of yellow (Y), magenta (M), cyan (C), and black (Bk) onto a transfer belt TB, and simultaneously transfers all color images onto a paper sheet, and is provided with image forming units of each color Y, M, C, Bk (i.e., photoconductive drums (PCy, PCm, PCc, PCbk), developing unit D, LED unit and the like) disposed at equidistant spacing (L mm in the example of the drawing) along the transfer belt TB.

A controller CNT is provided which includes a central processing unit (CPU) for controlling the entire apparatus, the previously mentioned PIC unit, and a CPU for controlling the drive of the transfer belt TB and the like.

A paper supply unit PU has a plurality of paper supply sections. In this image forming apparatus, the width of the paper feed path corresponds to the short edge of an A3 size sheet. Accordingly, A3 size paper is usable only when fed in a lengthwise direction. For this reason, the paper supply unit PU has a supply section A3LEF for supplying A3 size sheets in a lengthwise direction, a supply section A4LEF for supplying A4 size sheets in a lengthwise direction, and a supply section A4SEF for supplying A4 size sheets in a horizontal direction.

As shown in FIG. 2, the processing in the PIC unit basically parallel processing of the Y, M, C, Bk image data. That is, when image data are transmitted from the scanner image processing unit 12, the image data of each color Y, M, C, Bk generated by a single scanning operation are simultaneously input to the PIC unit side via the image interface 20. On the other hand, when image data are transmitted from the printer controller 14, the image data of each color Y, M, C, Bk are simultaneously input to the PIC unit side via the image interface 20 after raster image conversion by raster image processor (RIP).

The developing timing for the toners of each color Y, M, C, Bk requires that the toner of each color Y, M, C, Bk is overlaid on the transfer belt TB without color dislocation by delaying only a time corresponding to the spacing of the image forming units because the image forming units corresponding to each color are disposed at equidistant spacing in the direction of advancement of the transfer belt in the sequence Y, M, C, Bk. Therefore, in the system of the drawing, the image forming timing of each color Y, M, C, Bk is sequentially delay-controlled only by the time equivalent to the spacing.

Since electrostatic latent images are formed on the charged surface of each of the Y, M, C, Bk photoconductive drums by scanning via four LED heads in the system shown in the drawing, color dislocation is generated when skew distortion occurs due to shifting of the parallelism of the LED heads and the photoconductive drums (PCy, PCm, PCc, PCbk), and shifting of the print start position in the main scan direction. For this reason developing is stopped by the execution of image correction and position correction for all Y, M, C, Bk image data to prevent color dislocation.

(1-2) Summary of Processing by the PIC Unit

The processing by the PIC unit shown in FIG. 2 is summarized below along the data flow. Setting of the processing flow and various types of set values is accomplished by a CPU included in the controller CNT.

The image data of each color Y, M, C, Bk transmitted from the scanner image processor 12 or the printer controller 14 are input to the encoder 21. In the encoder 21, each 4×4 pixel block of image data is subjected to fixed-length compression by the GBTC method, and attributes are subjected to variable-length compression processing as necessary.

The fixed-length compression process is described in U.S. Pat. No. 5,987,175, and in "Block Coding of Still Pictures" published in *Transactions of the Institute of Electronics and Communications Engineers*, (1979/1, vol. J62-B No. 1, pp. 17~24).

In the fixed-length compression process, the image data of each block of 4×4 pixels are compressed into data of 48 bits. In the variable-length compression process, the 48-bit data obtained after the fixed-length compression process are converted to 2-bit, 10-bit, or 50-bit data according to attributes. The variable-length compression process is executed when the document image size is a size which does not require an editing process such as rotation or the like (i.e., the maximum size of the output sheet is A3 size). Both the fixed-length compression process and the variable-length compression process are described in detail later. Data of each color converted to 48-bit data by the fixed-length compression process, and data of each color subjected to the variable-length compression process after conversion to 48-bit data by the fixed-length compression process are respectively output to a 16-bit data bus.

Figure 1A:
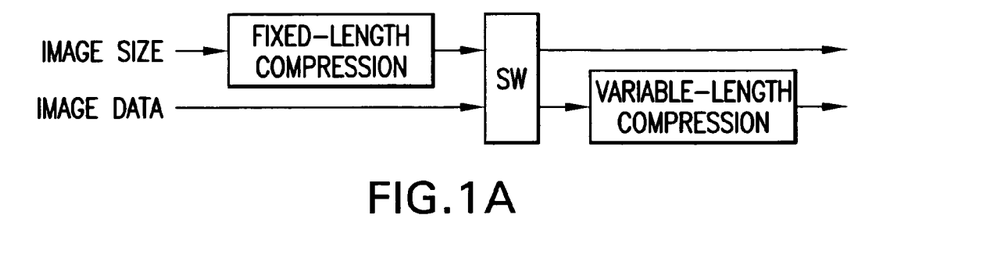
FIGS. 1A and 1B are block diagrams showing examples of the construction of the present invention.

FIG. 1A shows an example of the structure of the processing in the encoder 21. When the document image size is a size that cannot be subjected to an editing process such as rotation or the like (i.e., A3), the image data are converted to 48-bit data by the fixed-length compression process, and subsequently subjected to the variable-length compression process. On the other hand, when the document image size is a size that can be subjected to an editing process such as rotation or the like (i.e., A4 or smaller), the image data are only subjected to the fixed-length compression process and output as 48-bit data per 4×4 pixel block, and stored in the frame memory 22 of the subscan delay controller 23.

Figure 1B:
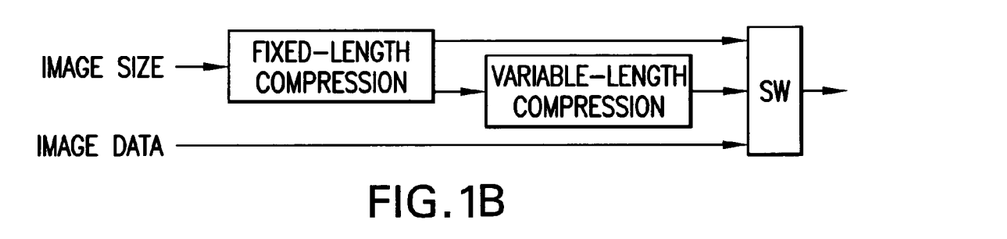

Although variable-length compression is switchably performed on fixed-length compression processed data as shown in FIG. 1A, fixed-length compression processed data and variable-length compression processed data of data subjected to fixed-length compression may be switchably output as shown in FIG. 1B.

FIGS. 1A and 1B show only selection of one of two paths of either a compression method allowing editing in a compressed state alone, or a compression method allowing editing in a compressed state and a compression method that does not allow editing in a compressed state, but since a structure allowing selection of a compression method allowing editing in a compressed state alone, or a compression method that does not allow editing in a compressed state alone is also possible, a structure allowing selection from among three paths also is possible.

In the subscan delay controller 23, the timing for reading data of each color Y, M, C, Bk from the frame memory 22 independently controls each color Y, M, C, Bk considering the spacing L (94.2 mm in the illustrated system) of the developing unit of each color. In this way, the position of the image of each color is corrected. For example, the position of the Bk image is corrected by setting the recording position of the farthest downstream image forming-unit Bk as the paper standard position. The image position of the data of each color Y, M, C is corrected using the image position corrected Bk data as a standard.

In the subscan delay controller 23, first, the data readout timing from the frame memory 22 is controlled in accordance with the printing operation process. That is, the data readout timing from the frame memory 22 is controlled in accordance with the process of the print mode operation, e.g., a duplex mode for printing on both sides of a sheet, a 2-in-1 mode for printing the images of two pages on the top half and the bottom half of one side of the same sheet, frame sequential mode for sequentially printing images on sheets, memory retention mode for repeatedly outputting an image to a plurality of sheets to print a multiple number of sheets and the like.

In the subscan delay controller 23, the readout address is controlled in accordance with the image editing mode when reading data from the frame memory 22. For example, when a mode for rotating an image is set, the image is rotated by controlling the readout address as described later.

The frame memory 22 has a capacity capable of storing data of each color Y, M, C, Bk of a standard A3 size image. That is, the frame memory 22 has a capacity sufficient for storing the data of a standard A3 size image as one frame. When this storage capacity is expanded to 4 frames, print production is improved because after printing a first frame in the duplex print mode, up to a maximum of 3 frames of image data of other documents can be stored while the first document is inverted by the inversion unit and the second frame is printed.

Data of each color Y, M, C, Bk readout from the frame memory 22 are converted to fixed-length compression data by the fixed-length data converter (variable-length code expander) 25. The variable-length expansion process is the reverse conversion process of the variable-length compression process. In this way the data of each color Y, M, C, Bk is reverse-converted to the pre variable-length compression processed data (i.e., fixed-length compression data comprising 48-bit data per 3×4 pixel block). The 48-bit data per 4×4 pixel block are stored in an internal memory having a capacity of several lines. Naturally, In the case of data not subjected to the variable-length compression process, such data are naturally not subjected to the variable-length expansion process by the fixed-length data converter 25. The variable-length expansion process is described in detail later.

The data of each color Y. M. C. Bk expanded by the variable-length expansion to 48-bits per 4×4 pixel block and the data of 48-bits per 4×4 pixel block read out from the frame memory 22 are subjected to main scan direction position adjustment and subscan direction skew correction by the correction unit 27, and are subsequently subjected to the fixed-length expansion process (GBTC decoding).

The main scan direction position adjustment (272) is accomplished by controlling the readout timing from the internal memory so as to match the standard position (center position) in the main scan direction which differs by sheet size with the center position of the transfer belt. Subscan direction skew correction 274 is accomplished by controlling the readout timing from the internal memory so as to shift the line of a specific number of pixels as a unit determined by the degree of skewing. The degree of skewing is detected by measuring the amount of dislocation relative to the Bk component when a test pattern of each color Y, M, C, Bk are overlaid on the transfer belt. Measurement of the amount of dislocation is accomplished using sensors not shown in the drawing and provided downstream from the Bk image forming unit. The fixed-length expansion process 271 is the reverse conversion process of the fixed-length compression process. In this way image data are regenerated from the compressed Y, M, C, Bk data and transmitted to the gradient regenerator 29.

In the gradient regenerator 29, after a resolution conversion process is executed to render each color Y, M, C, Bk at 2400 dpi, a gamma correction process is executed to correct gradient distortion due to gamma characteristics in the electrophotographic process, and the corrected image data of each color are respectively transmitted to the LED driver corresponding to the printhead controller 30. Before gamma correction, image edge detection is accomplished again, and in the text edge part, resolution is given priority and subjected to 1-dot cycle intensity modulation (ES process). At this time, in 2-dot cycle intensity modulation, a different screen angle is used for each color to improve image graininess (screen process).

(2) Details of the Coding Process (Compression)

Figure 3:
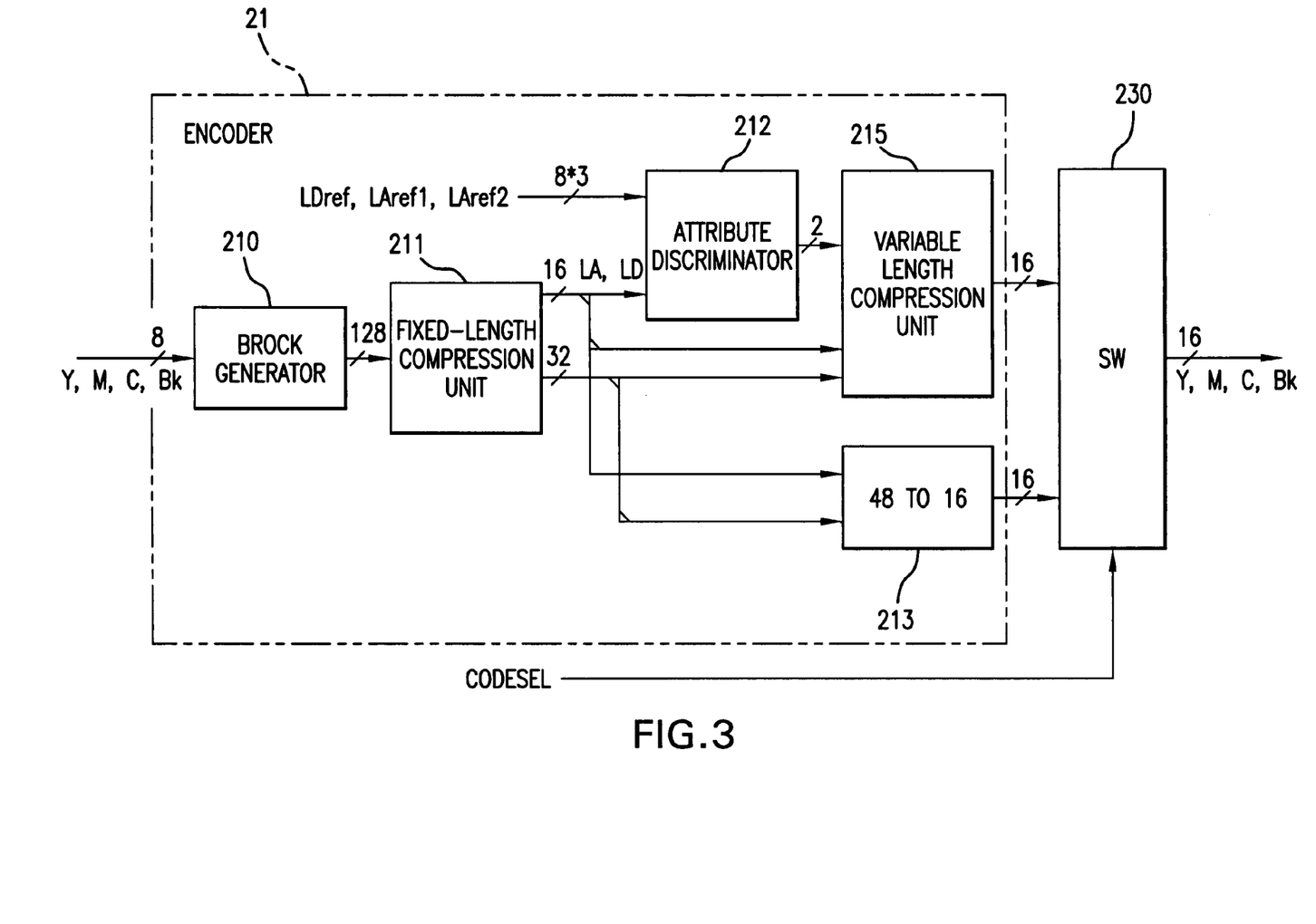
FIG. 3 is a block diagram mainly showing the encoding unit 21 of FIG. 2.
Figure 4:
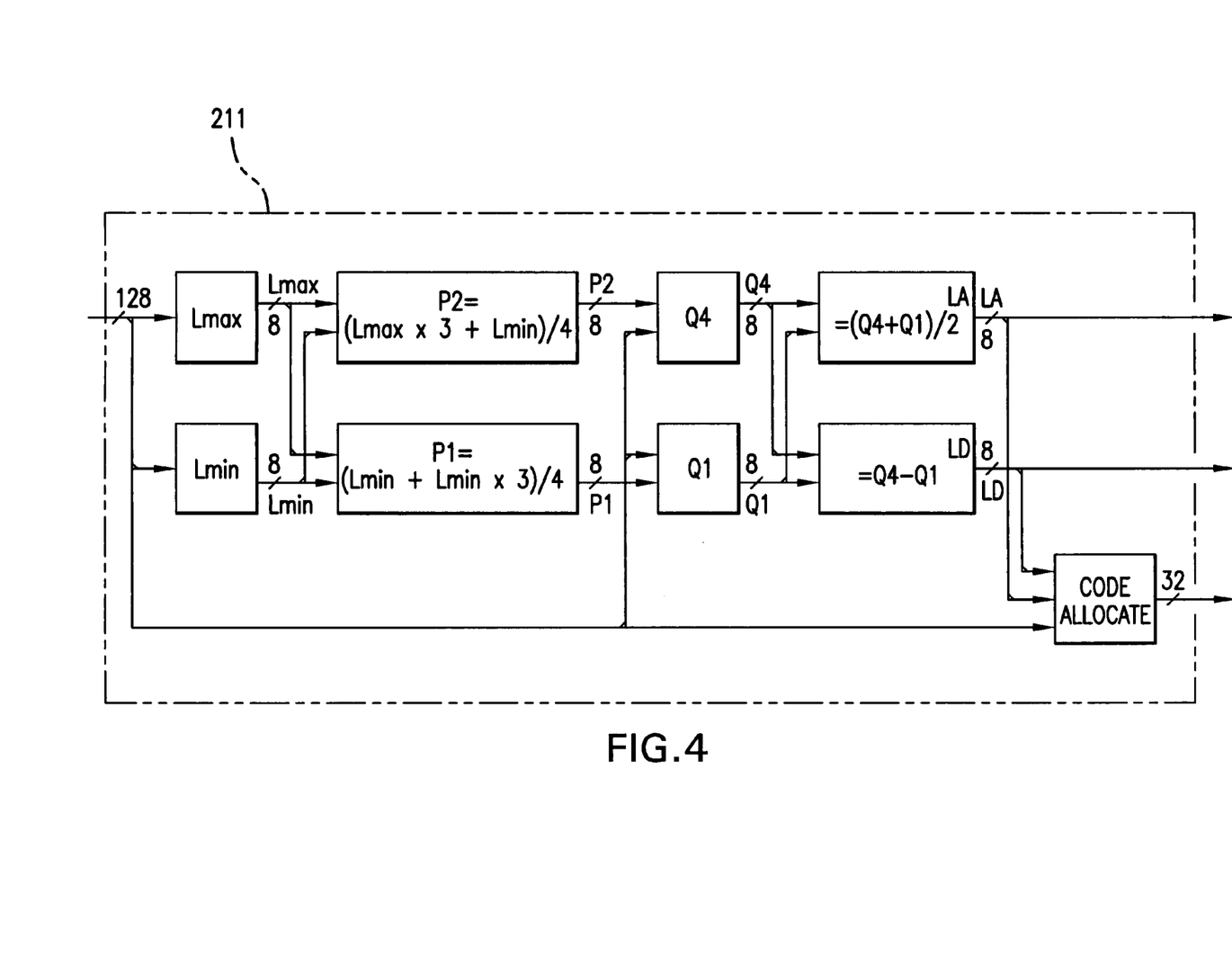
FIG. 4 is a block diagram showing the fixed-length compression unit 211 of FIG. 3.
Figure 5:
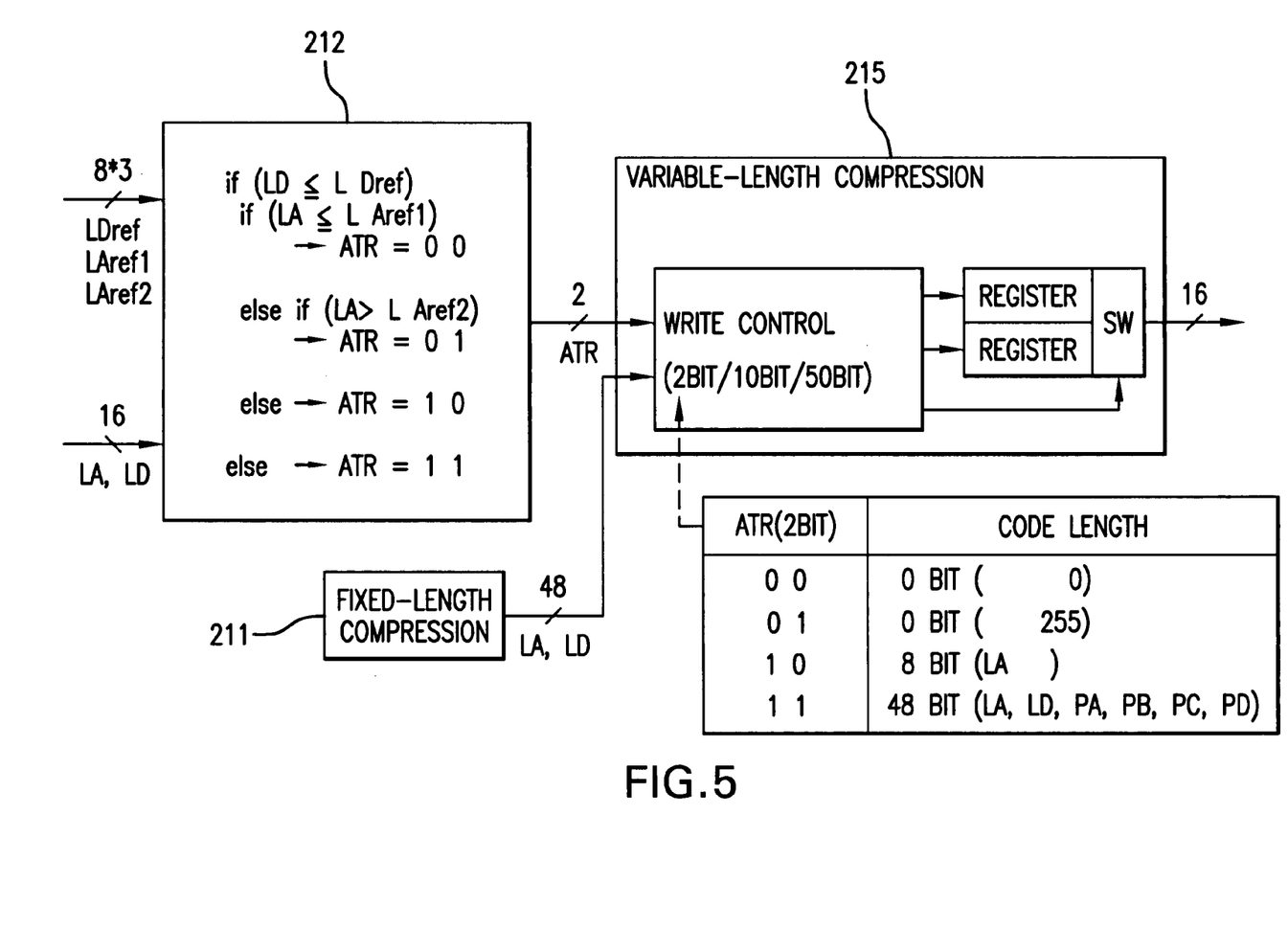
FIG. 5 is a block diagram mainly illustrating the attribute discriminator 212 and the variable-length code compression unit 215 of FIG. 3.

Details of the fixed-length compression process and the variable-length compression process executed as necessary after the GBTC method fixed-length compression are described below with reference to FIGS. 3~5. FIG. 3 is a block diagram mainly showing the encoder 21, FIG. 4 is a block diagram showing the fixed-length compression unit 211 of FIG. 3, and FIG. 5 is a block diagram mainly showing the attribute discriminator 212 and the variable-length compression unit 215 of FIG. 3.

(2-1) Block Generation

In the block generator 210 shown in FIG. 3, blocks are extracted as 4×4 pixel blocks from raster data of the image of each color Y, M, C, Bk of 8-bits per pixel. Each extracted block comprises 8×4×4=128 bits, and is transmitted to the fixed-length compression unit 211.

(2-2) Fixed-Length Compression Process

In the fixed-length compression unit 211 shown in FIG. 4, the previously mentioned 128-bit data are compressed by the GBTC method and converted to 48-bit compressed data. First, the maximum value (Lmax) and the minimum value (Lmin) are calculated from the image data corresponding to the 4×4 pixel block.

Then, internal points P2 and P1 are calculated based on the calculated maximum and minimum values. The internal point P2 is an internal point at which the gradient between the maximum and minimum values is 3:1, and is an internal point derived from the maximum value Lmax as calculated by expression (1) below. The internal point P1 is an internal point at which the gradient between the maximum and minimum values is 1:3, and is an internal point derived from the maximum value Lmin as calculated by expression (2) below.

$$P2 = (Lmax \times 3 + Lmin)/4 \quad (1)$$

$$P1 = (Lmax + Lmin \times 3)/4 \quad (2)$$

Next, an upper limit Q4 is calculated based on the calculated internal point P2 via expression (3) below, and a lower limit Q1 is calculated based on the internal point P1 via the expression (4) below.

$$Q4 = (\text{average value of image data} > P2) \quad (3)$$

$$Q1 = (\text{average value of image data} < P1) \quad (4)$$

Next, the block average value index LA is calculated via expression (5) below based on the calculated upper limit Q4 and lower limit Q1, and similarly the block gradient band index LD is calculated via expression (6) below based on the upper limit Q4 and lower limit Q1.

$$LA = (Q4 + Q1)/2 \quad (5)$$

$$LD = (Q4 - Q1) \quad (6)$$

Then, the data value of each pixel is quantified according to the rules of expressions (7)~(10) below based on the magnitude relationship of the average value index LA, gradient band index LD, and the data value of each pixel. In this way, each pixel is allocated a 2-bit code.

$$\text{Data value} > LA + LD/4 \rightarrow 11 \quad (7)$$

$$LA + LD/4 \geq \text{data value} > LA \rightarrow 10 \quad (8)$$

$$LA \geq \text{data value} > LA - LD/4 \rightarrow 01 \quad (9)$$

$$LA - LD/4 \geq \text{data value} \rightarrow 00 \quad (10)$$

By the above process the 4×4×8-bit=128-bit image data comprising the 8-bit LA and the 8-bit LD, and the 2-bit per pixel, 4×4 pixel 32-bit quantified code are compressed into 48-bit fixed-length data.

(2-3) Variable-Length Compression

The fixed-length compressed data are subjected to variable-length compression when the document size is A3. The variable-length compressor 215 executes a compression process in accordance with the discrimination results of the attribute discriminator 212.

(2-3-1) Attribute Discrimination

As shown in FIG. 5, the attribute discriminator 212 discriminates the attributes of each 4×4 pixel block based on the average value index LA and the gradient band index LD according to the rules within the attribute discriminator 212, and generates 2-bit attribute code for each block. This operation is described in sections (a)~(d) below.

(a) The attribute information ATR is set at [00] when LD is less than a predetermined gradient band reference value LDref and LA is less than a predetermined average value first reference value LAref1, since there is scant gradient difference within the block and the density level is low (i.e., near zero).

(b) The attribute information ATR is set at [01] when LD is less than a predetermined gradient band reference value LDref and LA is greater than a predetermined average value second reference value LAref2, since there is scant gradient difference within the block and the density level is high (i.e., near 255).

(c) The attribute information ATR is set at [10] when LD is less than a predetermined gradient band reference value LDref and LA is greater than a predetermined average value first reference value LAref1 but less than a predetermined average value second reference value LAref2, since there is scant gradient difference within the block and the density level is near intermediate.

(d) The attribute information ATR is set at [11] at other times, i.e., when LA is greater than a predetermined gradient reference value LDref since the gradient difference is large within the block.

The above three reference values LDref, LAref1, and LAref2 are values set in an internal register from the CPU, and are defined below. Setting these three reference values at suitable values allows adjustment of the compression ratio of the variable-length compression in consideration of image quality and balance.

(a) The gradient band reference value LDref is used in determining the magnitude of the gradient difference. When LDref is set at a large value, [ATR=11] decreases, the number of blocks without a gradient difference increases, and the number of blocks with a gradient difference decreases. When LSref is set at a small value, [ATR=11] increases, the number of blocks without a gradient difference decreases, and the number of blocks with a gradient difference increases.

(b) The average value first reference LAref1 is used in determining blocks of low density level. When LAref1 is set at a large value, [ATR=00] increases. For example, when LAref1 is set at LAref1=5, [ATR=00] when the density level of all pixels within a block are less than 5.

(c) The average value second reference value LAref2 is used in determining blocks of high density level. When LAref2 is set at a small value, [ATR=01] increases. For example, when LAref2 is set at LAref2=250, [ATR=01] when the density level of all pixels within a block is less than 250.

(2-3-2) Variable-Length Encoding

In the variable-length compressor 215, the data of each block of 4×4 pixels are converted according to rules stipulated in the lower right box of FIG. 5 in accordance with the value of the attribute information ATR input from the attribute discriminator 212.

(a) The [ATR=00] block is converted to only 2-bit attribute information [00].

(b) The [ATR=01] block is converted to only 2-bit attribute information [01].

(c) The [ATR=10] block is converted to 10-bit data comprising 2-bit attribute information [10], and 8-bit average value index LA from the attribute information [10].

(d) The [ATR=11] block is converted to 50-bit data comprising 2-bit attribute information [11], and 48-bit fixed-length compression data from the attribute information [11].

The variable-length compressed data converted from the 48-bit fixed-length compressed data to 2-bit attribute information, 2-bit attribute information, 10-bit data comprising 2-bit attribute information and 8-bit average value index LA, or 50-bit data comprising 2-bit attribute information and 48-bit fixed-length compressed data are stored in an internal register as shown in the upper right box in FIG. 5, and thereafter serially converted suitably for a 16-bit database and output.

(2-3-3) When Not Variable-Length Encoded

The variable-length compression process is performed only when the document image size is A3 (i.e., a size not requiring rotation since its the same size as the maximum size of the output sheet) because after variable-length compression, editing such as image rotation and the like cannot occur by address control when reading from the frame memory 22. That is, when the document size is A4 (i.e., a size that can be rotated since it is smaller than the maximum size of the output sheet), only the fixed-length compression process is performed and the variable-length process is not performed so as to execute the rotation process as necessary when reading from the frame memory 22. Although the compression ratio of the fixed-length compression process alone is less than the compression ratio when the fixed-length compression process and the variable-length compression process are sued together, a sufficient amount of data can be stored in the frame memory because the amount of data of an A4 size image is less than the amount of data of an A3 size image.

(3) Memory Control

The control for switchably writing to the frame memory 22 either the data subjected to only fixed-length compression (A4 size and smaller) or data subjected to variable-length compression after fixed-length compression, and the control for rotating an image by controlling the address when reading from the frame memory 22 are described below.

(3-1) Memory Write Control (Switch Control)

The switch from subjecting 48-bits per 4×4 pixel block fixed-length compressed data to variable-length compression and writing to frame memory 22, and simply writing the 48-bits per 4×4 pixel block fixed-length compressed data to frame memory 22 without variable-length compression at selector 230 is accomplished by the CPU in accordance with fixed-length/variable-length switch signal CODESEL set in an internal register. These controls are described below.

(a) When [CODESEL=0], fixed-length compressed data are subjected to variable-length compression and then stored in frame memory 22.

(b) When [CODESEL=1], fixed-length compressed data are not subjected to variable-length compression, and are directly written to frame memory 22.

The CODESEL is determined in accordance with the document size. That is, [CODESEL=0] when a document is A3 size. [CODESEL=1] when a document is A4 size or smaller.

Only A3 and A4 sizes are described to simplify the description of the present invention. However, optional sizes also may be set.

When a document size is smaller than A4, the fixed-length compressed data of 48-bits per 4×4 pixel block are stored in frame memory 22 via the previously described switch control. For this reason, an image can be rotated 90° via address control to switch the row address and column address when reading from the frame memory 22. That is, edit processing is possible in a compressed state. When a document is A3 size, fixed-length compressed data of 48-bits per 4×4 pixel block are subjected to variable-length compression, then stored in frame memory 22. For this reason the amount of data can be reduced beforehand, an a relatively small capacity and inexpensive memory can be used as the frame memory 22., thereby reducing cost. For example, In the system of the present embodiment, A4 size 600 dpi image data can be stored in a frame memory 22 comprising 2 DRAM having 64 MB per color.

(3-2) Memory Readout Control (Image Rotation)

Figure 8:
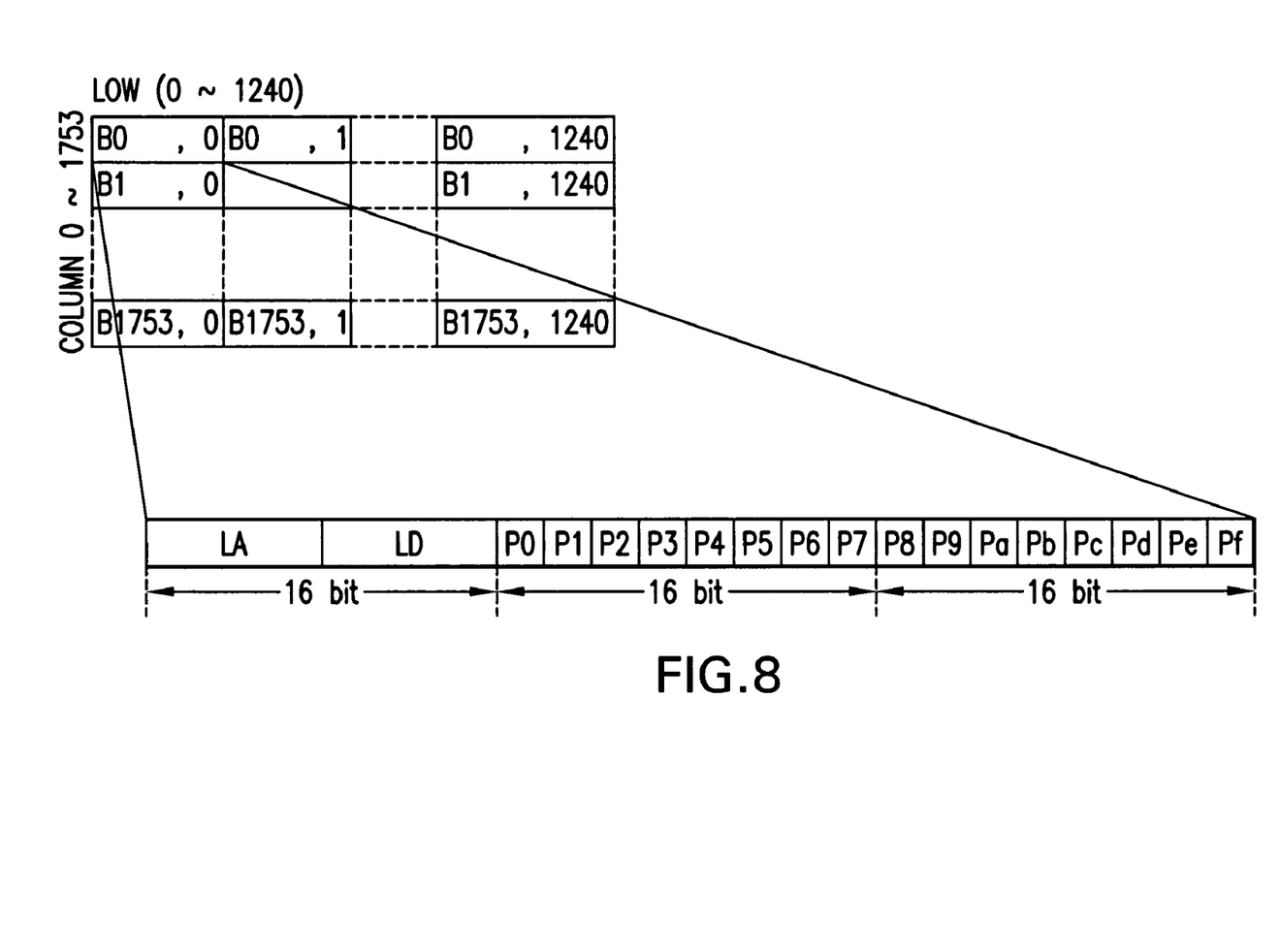
FIG. 8 illustrates the structure of data stored at each address in the frame memory 22.

FIG. 8 illustrates data stored at each address within the frame memory 22. As shown in the drawing, each address in frame memory 22 is specified by row address and column address. The fixed-length compressed data of 48-bits per block comprise the 8-bit average value index LA, 8-bit gradient band index LD, and each 2-bit attribute data totaling 32-bits of code information P0~Pf.

Figure 9A:
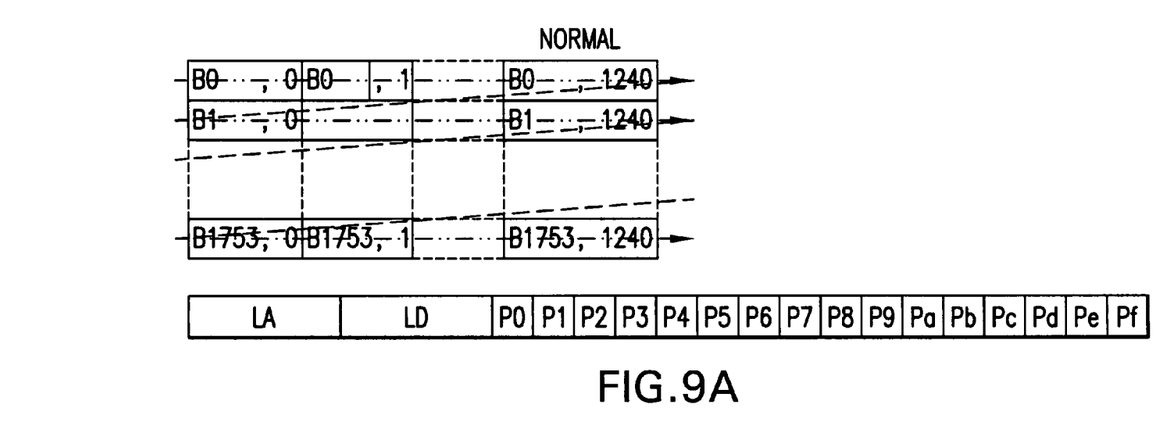
FIGS. 9A and 9B illustrate the readout sequence from the frame memory 22 at zero (0) degrees rotation (normal) and 90 degrees rotation.
Figure 9B:
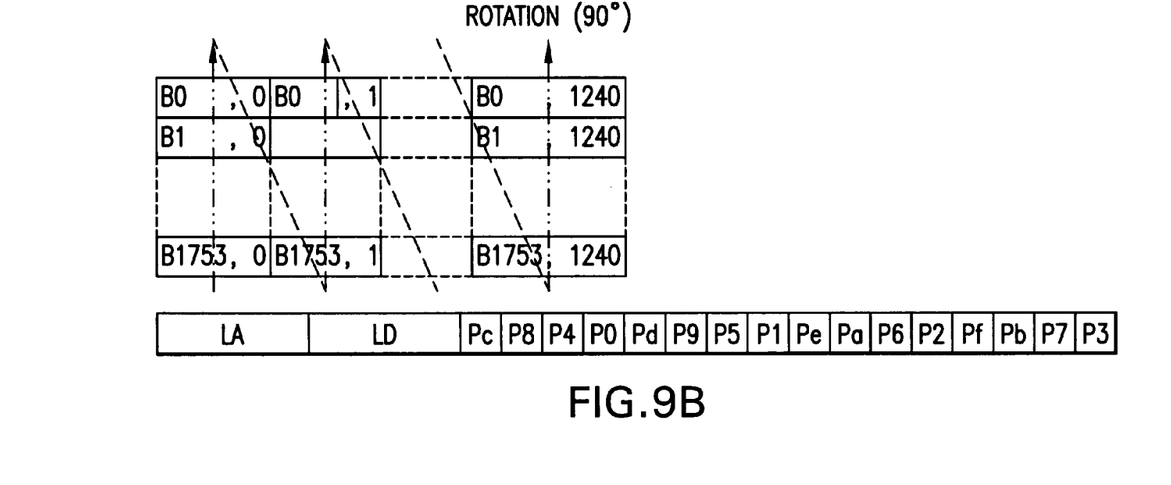

FIG. 9 shows the process for rotating an image by switching the row address and the column address when reading from the frame memory 22 so as to read the column address in reverse order. As shown in FIG. 9A, when an image is not rotated, the row address is read in standard order from the left end of the row, and rows are read in standard order from the top row. On the other hand, as shown in FIG. 9B, when an image is rotated 90°, the column address is read in reverse order from the bottom end of the column, and the columns are read in standard order from the top column. At this time, the rows and columns are also switched for the 32-bit code information P0~Pf within each 48-bit code data. That is, the lower 32-bit data within each address are read in the sequence Pc, P8, P4, P0, Pd, P9, P5, P1, Pe, Pa, P6, P2, Pf, Pb, P7, P3.

(4) Variable-Length Code Expansion (Fixed-Length Data Conversion)

Figure 6:
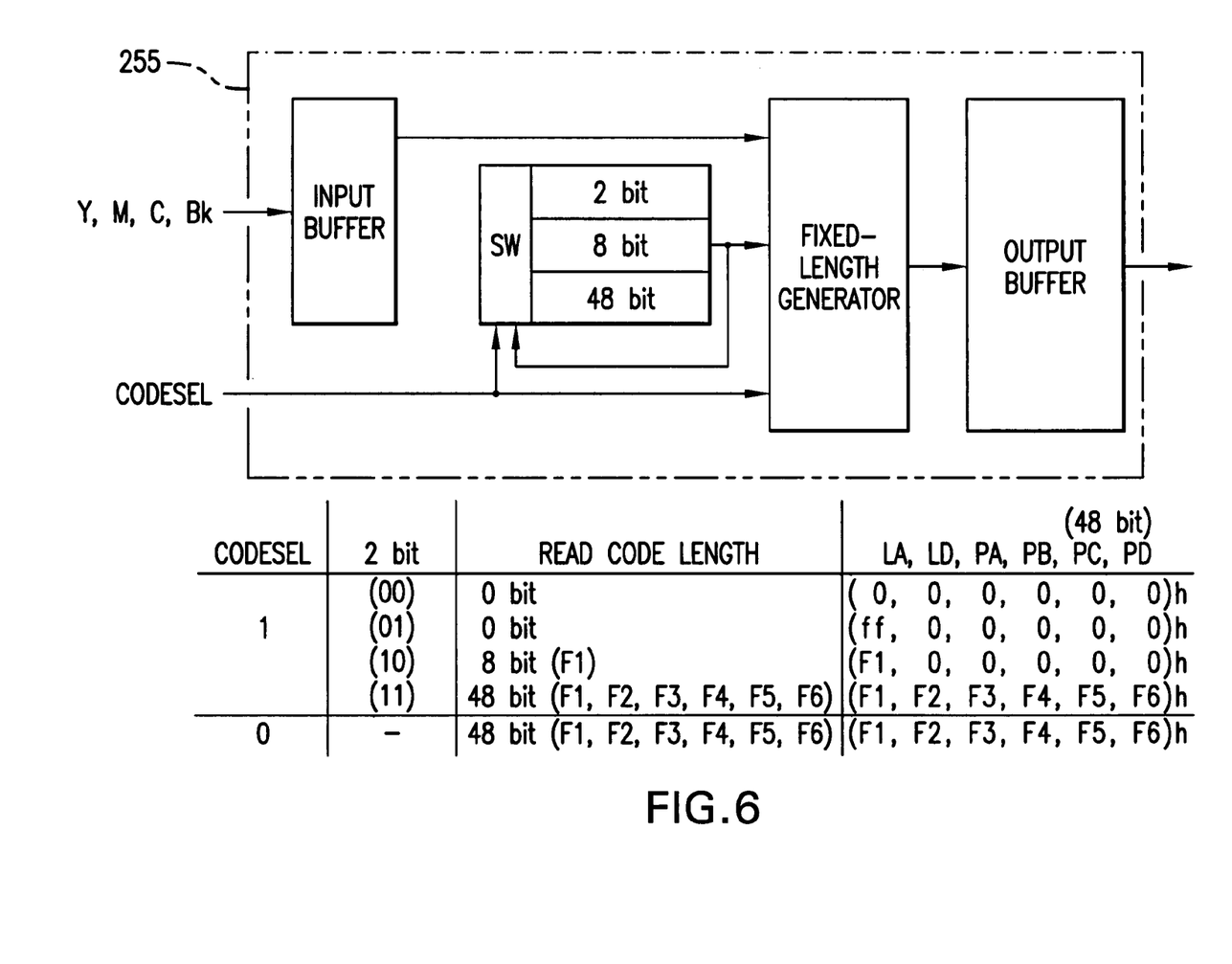
FIG. 6 is a block diagram illustrating the fixed-length data converter 25 of FIG. 2.
Figure 7:
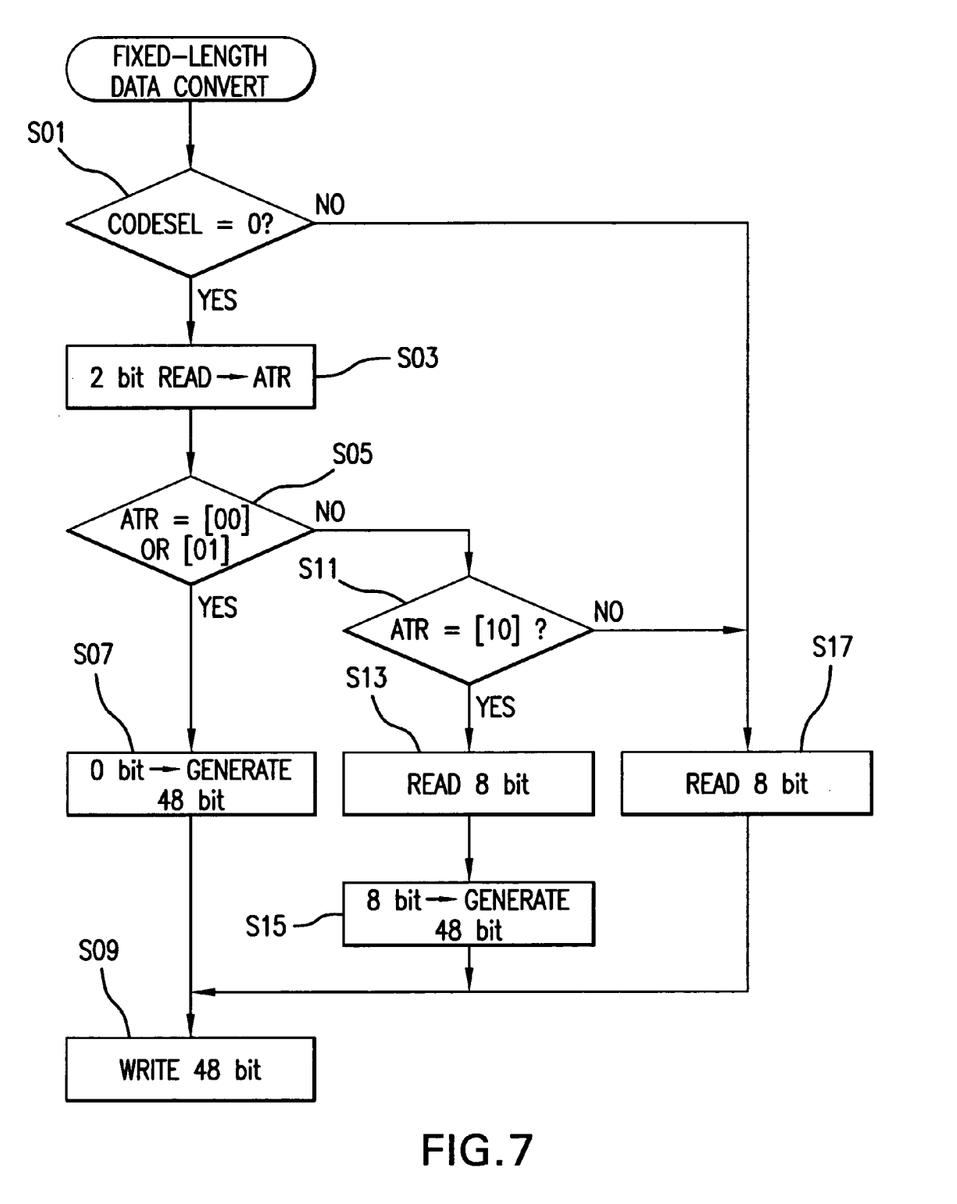
FIG. 7 is a flow chart showing the processing sequence by the variable-length expansion unit 255 of FIG. 6.

FIGS. 6 and 7 show the process of reading data (fixed-length compressed data, and fixed-length compressed data with variable-length encode compressed data) stored in frame memory 22, and generating fixed-length compressed data of 48-bits per 4×4 pixel block. This process reverse converts the variable-length encode compression process, i.e., is a variable-length encode expansion process.

The data of each color Y, M, C, Bk are read from frame memory 22 in sequence by a timing determined by the spacing between the image forming units of each color (L mm in the present example), and the data are first written to an input buffer.

When the fixed-length/variable-length switch signal CODESEL sent from the CPU is [0], data have been subjected to fixed-length compression and thereafter subjected to variable-length compression, and the document size is A3 in the present example. In this case, the variable-length expansion process is executed in accordance with a fixed-length generation algorithm shown in the top frame of the lower level of FIG. 6.

That is, the process described below is executed to generate 48-bit data (new fixed-length compressed data) in accordance with an algorithm corresponding to the value of the 2-bit attribute information ATR read from the input buffer, and write these data to an output buffer.

(a) When the attribute information ATR is [00], 48-bit data are generated in which the average value index LA=00h, the gradient band index LD=0h, and the code information=0000h.

(b) When the attribute information ATR is [01], 48-bit data are generated in which the average value index LA=ffh, the gradient band index LD=0h, and the code information=0000h.

(c) When the attribute information ATR is [10], 48-bit data are generated in which the 8-bit data F1h from the 2-bit attribute information is designated the average value index LA, such that [LA=F1h], the gradient band index LD=0h, and the code information=0000h.

(d) When the attribute information ATR is [11], the 48-bit data from the 2-bit attribute information are generated directly as new fixed-length compressed data.

On the other hand, when the fixed-length/variable-length switch signal CODESEL sent from the CPU is [1], data have been compressed only by fixed-length compression, and the document size is A4 in the present example. In this case, the data read from the input buffer are used to directly generate new fixed-length compressed data and stored in the output buffer, as shown in the bottom frame of the lower level of FIG. 6.

(5) Data Compression Effectiveness

Figure 10:
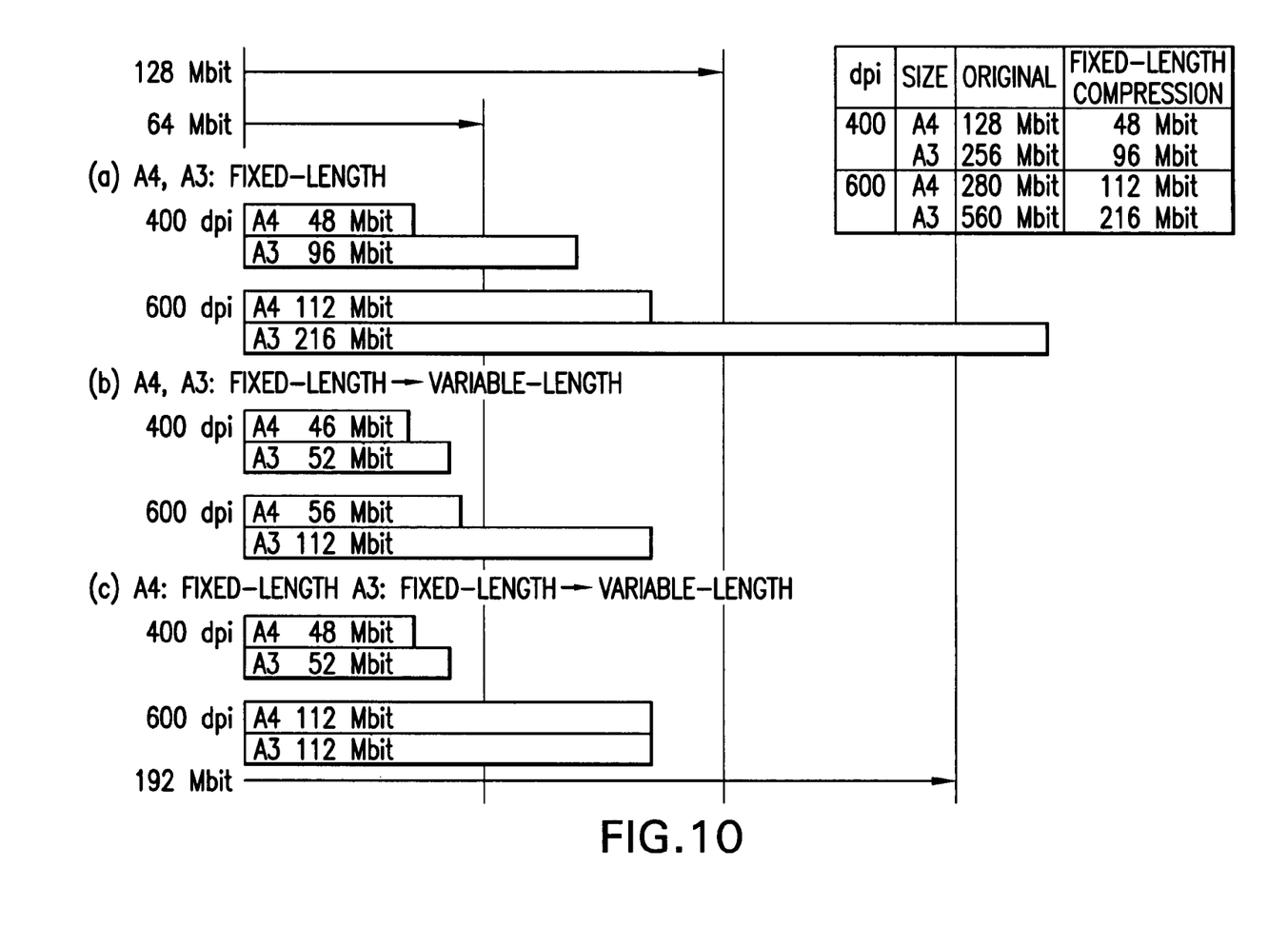
FIG. 10 illustrates the effectiveness of compression method selection.

FIG. 10 shows comparisons of the amount of data per color for A4 and A3 size images, and the amount of data at 400 and 600 dpi when such data are subjected to fixed-length compression only, and when subjected to variable-length compression after fixed-length compression.

As can be understood from comparing FIGS. 10(a) and 10(b) (or 10(c)), for an A3 size image, the amount of data can be reduced to less than 128 MB even at 600 dpi by subjecting the data to variable-length compression after fixed-length compression. That is, the data can be stored in the system of the present example constructed using two 64 MB DRAMs.

As can be further understood from comparing FIGS. 10(a) and 10(b) (or 10(c)), for an A4 size image, the amount of data can be reduced to less than 64 MB at 60 dpi by subjecting the data to variable-length compression after fixed-length compression, but since the amount of data is less than 128 MB even when only fixed-length compression is used, the system of the present example constructed using two 64 MB DRAMs is sufficient to store the data even without variable-length compression. Furthermore, by not using variable-length compression, the process effectively allows rotating of the image by controlling the readout address from the frame memory 22.

In the present invention, since image data compressed by a compression method in accordance with the image size are stored in memory, a relatively large amount of data according to image size can be stored in a relatively small memory, image formation can be accomplished at higher speed, color image formation can be accomplished at higher speed, and cost can be reduced. Furthermore, a compression method allowing image editing in a compressed state can be selected in accordance with image size.

Since fixed-length compression is selected below a predetermined size, editing processes such as rotation and the like can be readily performed in a compressed state.

Although preferred embodiment(s) of the invention have been described in the foregoing detailed description and illustrated in the accompanying drawings, it will be understood that the invention is not limited to the embodiment(s) disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. An image processing apparatus comprising:
    a memory for storing image data;
    a designator for designating the image size; and
    a compression system which compress the image data by
       a compression method corresponding to the image size designated with the designator and sends the compressed image data to the memory,
    wherein said compression system includes a first compression method which allows image editing in a compressed state and a second compression method which does not allow image editing in a compressed state.

2. An apparatus according to claim 1, wherein said first compression method is fixed-length compression method and said second compression method is variable-length compression method.

3. An apparatus according to claim 1, wherein said compression system selects a compression method for accomplishing a second compression method after a first compression method when a designated image size is larger than a specific size, and selects only a first compression method when a designated image size is smaller than the specific size.

4. An apparatus according to claim 1, wherein said image data are image data of four colors yellow, magenta, cyan, and black, and both compression and storage to memory are executed in parallel for each color.

5. An apparatus according to claim 1, further comprising:
    an expansion system which expand the image data stored in the memory by a expansion method corresponding to the compression method which image size designated with the designator and sends the compressed image data to the memory.

* * * * *